Feb. 25, 1958  N. VANDERSCHEL  2,824,406
FREE FLIGHT TIMER TANK FOR MODEL AIRCRAFT
Filed Oct. 26, 1956
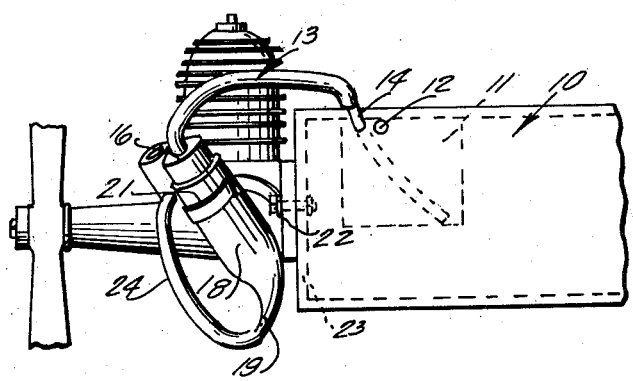
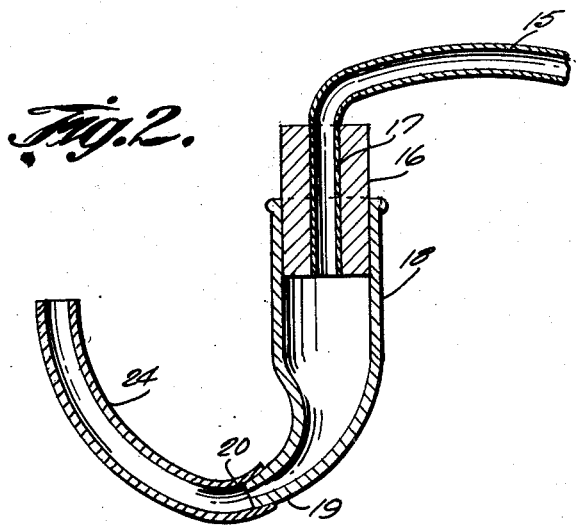
INVENTOR.
NORMAN VANDERSCHEL
BY Victor J. Evans & Co.
ATTORNEYS

United States Patent Office 2,824,406
Patented Feb. 25, 1958

2,824,406

FREE FLIGHT TIMER TANK FOR MODEL AIRCRAFT

Norman Vanderschel, Lubbock, Tex.

Application October 26, 1956, Serial No. 618,483

2 Claims. (Cl. 46—78)

This invention relates to model aircraft, and more particularly to a mechanism for timing the motor run on free flight type of model aircraft competition.

The object of the invention is to provide a timing mechanism for a model aircraft or model airplane whereby the model airplane will be permitted to operate for only a predetermined period of time.

Another object of the invention is to provide a timing mechanism for a model airplane wherein the timing mechanism can be adapted to various types of motors whereby the present invention will eliminate overruns and whereby lost airplanes due to excessive altitude will be prevented or minimized.

A further object of the invention is to provide a free flight timer for model aircraft, which is extremely simple and inexpensive to manufacture.

Other objects and advantages will be apparent during the course of the following description.

In the accompany drawings, forming a part of this application, and in which numerals are used to designate like parts throughout the same.

Figure 1 is a fragmentary side elevational view illustrating the timer of the present invention mounted on a model aircraft.

Figure 2 is a longitudinal sectional view taken through the timer showing the timer detached from the model aircraft.

Referring in detail to the drawings, the numeral 10 indicates the front part of a fuselage of a model aircraft, and arranged in the fuselage 10 is a reserve tank 11 which is provided with an air vent or opening 12, Figure 1. The model aircraft further includes a conventional engine or motor 13, and the present invention is directed to a timing mechanism for permitting the aircraft to operate for a predetermined period of time.

The timing mechanism of the present invention includes a tube 14 which extends outwardly from the reserve tank 11 and communicates therewith. Connected to the outer end of the tube 14 is a first conduit 15, and there is further provided a stopper or adjustable piston 16 which is provided with a central opening or bore 17 that receives an end of the conduit 15. The piston 16 is adjustably mounted in a housing 18 which defines a fuel reservoir, and the housing 18 has one end terminating in a tapered neck 19 which is provided with an opening 20, Figure 2. For supporting the housing 18, there is provided a spring clamp 21 which may be connected to the front part of the aircraft by suitable securing elements such as the bolts 22, the numeral 23 designating the usual fire wall of the aircraft. The timing mechanism of the present invention further includes a second conduit 24, and one end of the conduit 24 is connected to the neck 19, while the other end of the conduit 24 leads to the aircraft engine or motor 13.

The present invention can be easily produced, and is simple in construction and is low in cost, and is readily adaptable and accurate and the device provides a means for timing the motor run on free flight types of model aircraft as when such model aircrafts are used in competition. A. M. A. rules provide for a motor run of not more than 15 seconds when the model is hand launched or 20 seconds when the model rises off the ground. In the event the motor runs longer by even a fraction of a second, the flight is not official and the flyer is not given credit for the time that the model is in the air. Thus, the object of free flight flyers is to try to get all of the allowable time for maximum altitude without getting an over run.

Heretofore, the following methods have been used to try and accomplish the above. First, air lock mechanical timers have been used and this method has been the most common but has often caused a great deal of troublesome failures. The air lock mechanical timers are adapted to shut the fuel supply off after a pre-adjusted period and their cost at retail is usually from $2.25 to $3.25. This method does not work satisfactorily because of motor vibration, changes in temperature or humidity and these timers require constant adjusting and often fail to shut off the fuel entirely which usually results in a lost model.

Another previous construction makes use of the clock work timers which often work satisfactorily but the cost is too high for the average model user since such devices usually retail for approximately $3.95 or more and many persons of limited means cannot afford this cost because models are often lost from this type of competition.

Another construction involves the use of eye dropper tanks which are sometimes used on small displacement models and this method uses the eye dropper for both the fuel tank and timing. Thus, before the model is released, the fuel is permitted to run down to a predetermined mark on the dropper and while this method is fairly reliable and cheap, it has certain objections which a true competitor cannot afford. One objection is that an excessive length of fuel line is required and the other is that there is an inadequate reserve fuel supply to permit the flyer sufficient time to prepare the model for flight after the motor is started. Thus, a fuel line which is too long can prevent a motor from running smoothly and also causes a variation in motor run or inconsistency in time.

A further previous construction utilized timer tanks but very few manufacturers have built this tank to go with their particular type of engine and this tank and motor assembly mounts on the front of the aircraft as a single unit. The tank is usually an integral part of the motor which is separated by a gasket, and the tank is divided into two compartments with a spring loaded valve therebetween. Thus, the lower compartment acts as the metered supply of fuel and the valve separating this compartment is tripped as the model is released. The objection to this construction is that the model users have a choice of many makes of engines and he does not have to be limited to the motor which supplies a timer tank and this construction requires that the motor always be mounted in an upright position on the fire wall as the tank will not function in any other position. Thus, many good aircraft designs provide that the motors should be mounted in an inverted position or mounted on the side. A further objection is the adjustment for the proper amount of fuel in the metered compartment and this requires much time since the engine has to be removed from the firewall for each adjustment and furthermore fuel displacement blocks must be removed or inserted by trial and error until just the right amount of fuel is permitted to remain in the metered reservoir. The fuel consumption of a model engine varies with the temperature, humidity, and altitude as well as the size of propeller used. Thus, a true competitor must make frequent compensations on the contest site but the ability to make quick adjustments is a great help and this method is therefore a real handicap.

Applicant's method or construction combines a readily adjustable metered supply of fuel, a reserve fuel supply in the form of a standard fuel tank which is supplied by the various manufacturers, or the type which is a part of the engine the modeller uses. Applicant's invention combines the advantages of all the timer tank methods with adaptability to any make of motor or any type of motor installations so that it can be manufactured to retail for only a small part of the cost of the timers which are now available. The present device can be made of any substance which is not affected by the various types of alcohol used in model fuel. Thus, the parts can be made of glass, neoprene type of plastic, metal or the like.

The various parts of the timing mechanism can be made of any suitable material such as a transparent material which may be glass, plastic or the like. The piston 16 fits snugly in the housing 18 so that there will be no accidental change of the reservoir adjustment. The spring clamp 21 can be secured to the motor or to the fuselage and the spring clamp 21 permits the tank 18 to be easily and quickly removed for adjustments, cleaning or the like. The fuel line 15 leads to the reserve fuel tank 11, and the piston or adjustable stopper 16 is made from a semi-pliable substance which forms an airtight seal with the inner tank wall. The fuel reservoir tank 18 can be easily adjusted by moving the piston or plunger 16 in or out thereof.

In use, the fuel line 24 is disconnected from the motor 13 to fill both tanks. As the fuel is pumped into the timer tank 18, it travels through the tank 18 to the reserve tank 11 until both tanks are full. The reserve tank 11 is full when fuel runs out of the air vent 12 which is provided at the top of the reserve tank 11. The fuel line 24 is then reattached to the motor 13 and when the engine starts, the fuel is drawn through the timer tank 18 and out of the reserve tank 11. The airtight fit of all parts in the timer tank 18 creates a perfect vacuum which permits the engine to be run on fuel from the reserve tank 11 until the ship is ready to launch. Before the ship is launched, the fuel line 15 which is connected to the adjustable stopper 16 is pulled loose from the reserve fuel supply, and the fuel line then acts as a vent for the timer tank 18 so that the motor continues to run until the fuel in the timer tank 18 is exhausted. This method completely eliminates drastic overruns as in the case of stuck mechanical timers when all of the fuel in the reserve tank is gone, before the motor stops, which usually results in a lost airplane due to excessive altitude.

The engine or motor 13 is of conventional construction, and the spring clamp 21 permits the timer to be readily removed. However, other methods of attaching the tank or timer in place could be used besides the spring clamp 21, but the spring clamp has the further advantage in that it helps to absorb shocks. The fuel line 24 leads to the motor.

I claim:

1. In a model aircraft of the type including a fuselage, a reserve tank arranged in said fuselage, there being an air vent communicating with said reserve tank, a motor extending from said fuselage, a tube extending outwardly from said reserve tank, a first conduit having one end connected to said tube, an adjustable piston provided with a central bore communicating with said first conduit, a housing snugly receiving said piston and said housing defining a fuel reservoir tank, said housing having one end terminating in a tapered neck provided with an opening, a spring clamp connecting said housing to said fuselage, and a second conduit leading from said neck to the motor.

2. In a model aircraft of the type including a fuselage, a reserve tank arranged in said fuselage, there being an air vent communicating with said reserve tank, a motor extending from said fuselage, a tube extending outwardly from said reserve tank, a first conduit having one end connected to said tube, an adjustable piston provided with a central bore communicating with said first conduit, a housing snugly receiving said piston and said housing defining a fuel reservoir tank, said housing having one end terminating in a tapered neck provided with an opening, a spring clamp connecting said housing to said fuselage, and a second conduit leading from said neck to the motor, said piston being made of a semi-pliable material.

References Cited in the file of this patent

UNITED STATES PATENTS

| | | |
|---|---|---|
| 679,050 | Girouard | July 23, 1901 |
| 1,447,690 | Robinson | Mar. 6, 1923 |
| 2,576,555 | Atwood et al. | Nov. 27, 1951 |